US012766875B2

(12) United States Patent
Buyanov

(10) Patent No.: US 12,766,875 B2
(45) Date of Patent: Oct. 20, 2026

(54) DEVICE AND METHOD FOR STRING ART

(71) Applicant: Alexander Buyanov, Hollywood, FL (US)

(72) Inventor: Alexander Buyanov, Hollywood, FL (US)

( * ) Notice: Subject to any disclaimer, the term of this patent is extended or adjusted under 35 U.S.C. 154(b) by 326 days.

(21) Appl. No.: 18/589,283

(22) Filed: Feb. 27, 2024

(65) Prior Publication Data

US 2024/0294032 A1 Sep. 5, 2024

Related U.S. Application Data

(60) Provisional application No. 63/487,932, filed on Mar. 2, 2023.

(51) Int. Cl.
*B44C 1/28* (2006.01)
*B44C 5/00* (2006.01)
*G09B 5/06* (2006.01)

(52) U.S. Cl.
CPC .................. *B44C 1/28* (2013.01); *B44C 5/00* (2013.01); *G09B 5/065* (2013.01)

(58) Field of Classification Search
None
See application file for complete search history.

(56) References Cited

U.S. PATENT DOCUMENTS

| | | | | |
|---|---|---|---|---|
| 6,252,996 | B1 | 6/2001 | Putnam | |
| 10,916,001 | B2 | 2/2021 | Lu et al. | |
| 11,401,634 | B2 | 8/2022 | Smith | |
| 11,704,765 | B2 | 7/2023 | Kamath et al. | |
| 2020/0060395 | A1 * | 2/2020 | Dholakiya | A44C 5/00 |
| 2020/0094615 | A1 * | 3/2020 | Chen | A44C 25/00 |
| 2022/0391436 | A1 * | 12/2022 | Schroder | G06T 11/00 |

* cited by examiner

*Primary Examiner* — Bruk A Gebremichael
(74) *Attorney, Agent, or Firm* — Cherskov Flaynik & Gurda, LLC

(57) ABSTRACT

A string kit and method of use are provided that converts an image into simple directions to create string art. The string kit includes a container foldable into a stand. The stand includes a rigid backing, a canvas mounted on the backing, canvas holders positioned on the backing, nails transversing the canvas, and a thread holder mounted on the backing. The string kit also includes a string art application that converts an image into a series of directions for placing the thread around the nails, thereby creating a string art replica of the image over the canvas. A method for making a string art is also discussed.

20 Claims, 8 Drawing Sheets

DEVICE AND METHOD FOR STRING ART

CROSS-REFERENCE

This application claims priority to U.S. Provisional Application Ser. No. 63/487,932, filed on Mar. 2, 2023. The contents of that application are hereby incorporated by reference.

TECHNICAL FIELD

The present invention relates to a system and method for producing art and, more specifically, to a kit for producing string art.

BACKGROUND

String art is a form of art in which colored thread or single colored thread is arranged between points to form geometric patterns or designs that represent images. The thread is wound around nails arranged on a surface. The straight lines of the thread wound around the nails have different angles and lengths across the surface, and thereby combine to create a design or image.

SUMMARY

An object of the present invention is to provide a string kit that converts an image into easy-to-follow directions to create a string art piece of the image. The string kit is suitable for all skill levels and makes it easy and enjoyable to create a personal string art painting. The string kit provides numerous benefits, especially for people who are looking for ways to reduce stress and enjoy a creative activity.

Thus by one aspect of the present invention, a string kit is provided that includes a container for storing the string kit. The container is foldable into a stand for the string kit. The stand includes a rigid backing, a canvas mounted detachably on the backing, a plurality of canvas holders positioned on the backing for holding the canvas against the backing, a plurality of nails transversing the canvas, and a thread holder mounted on the backing for holding a skein of a thread. The string kit also includes a string art application in communication with a personal electronic device, wherein the application converts an image into a series of directions for placing the thread around the nails, thereby creating a string art replica of the image over the canvas.

By a further aspect of the present invention, a method is provided for making a string art. The method includes folding a string kit container into a string kit stand. The string kit stand includes a rigid backing, a canvas mounted detachably on the backing, a plurality of canvas holders positioned on the backing for holding the canvas against the backing, a plurality of nails transversing the canvas, and a thread holder mounted on the backing for holding a skein of a thread. The method further includes converting an image into a series of directions for placing the thread around the nails using a string art application in communication with a personal electronic device and creating a string art replica of the image over the first surface of the canvas by placing the thread around the nails according to the series of directions.

BRIEF DESCRIPTION OF THE DRAWINGS

The invention, together with the above and other objects and advantages, will be best understood from the following detailed description of the preferred embodiment of the invention shown in the accompanying drawings wherein.

DETAILED DESCRIPTION

The present application provides a string kit that makes it easy to create a beautiful string art painting from any photo. The string kit is designed to be user-friendly, allowing people with no artistic experience to create stunning works of art.

While a number of screen views are shown for reference and to help illustrate the invention, the disclosure should not be considered to be limited to the implementations shown in the screen capture images. Further, while the device shown in the screen views is a portable computing device such as a phone or a tablet, this should not be considered limiting. The process can be operated from any number of devices, including, for example, a laptop computer or a desktop computer with a monitor.

Figure 1:
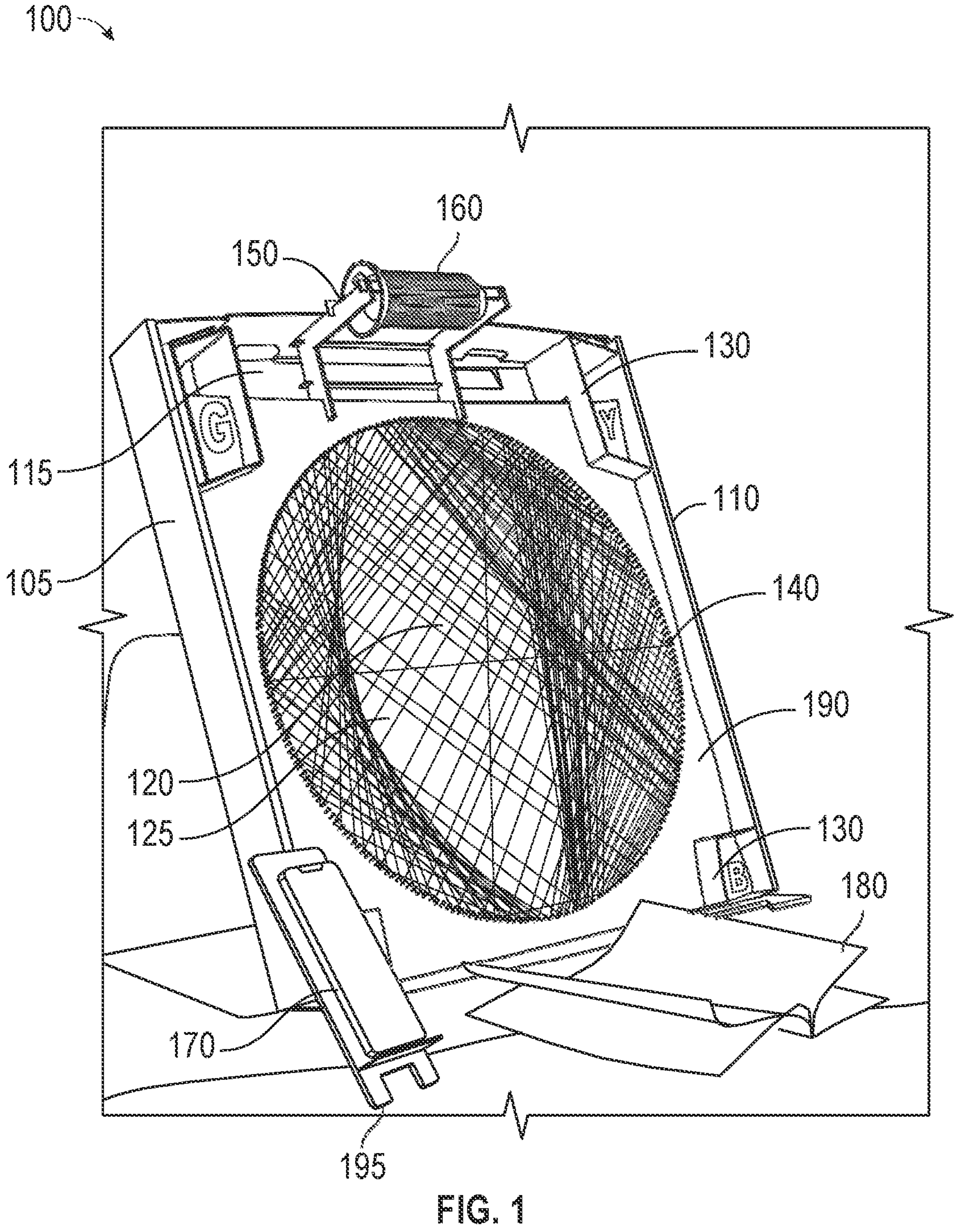
FIG. 1 depicts a transverse view of an embodiment of a string kit of the present invention.

An embodiment of the string kit is provided in FIG. 1. The string kit 100 includes a container 105 for storing the string kit. The container 105 is foldable into a stand 110, which includes a rigid backing 115 and a canvas 120 detachably mounted on the backing. The canvas 120 has a first surface 125 and an opposing second surface (not shown). The stand 110 further includes canvas holders 130 positioned on the backing 115 for holding the canvas 120 against the backing 115, nails 140 that transverse the canvas 120 and a thread holder 150 mounted on the backing 115 for holding a skein of thread 160.

Figure 2:
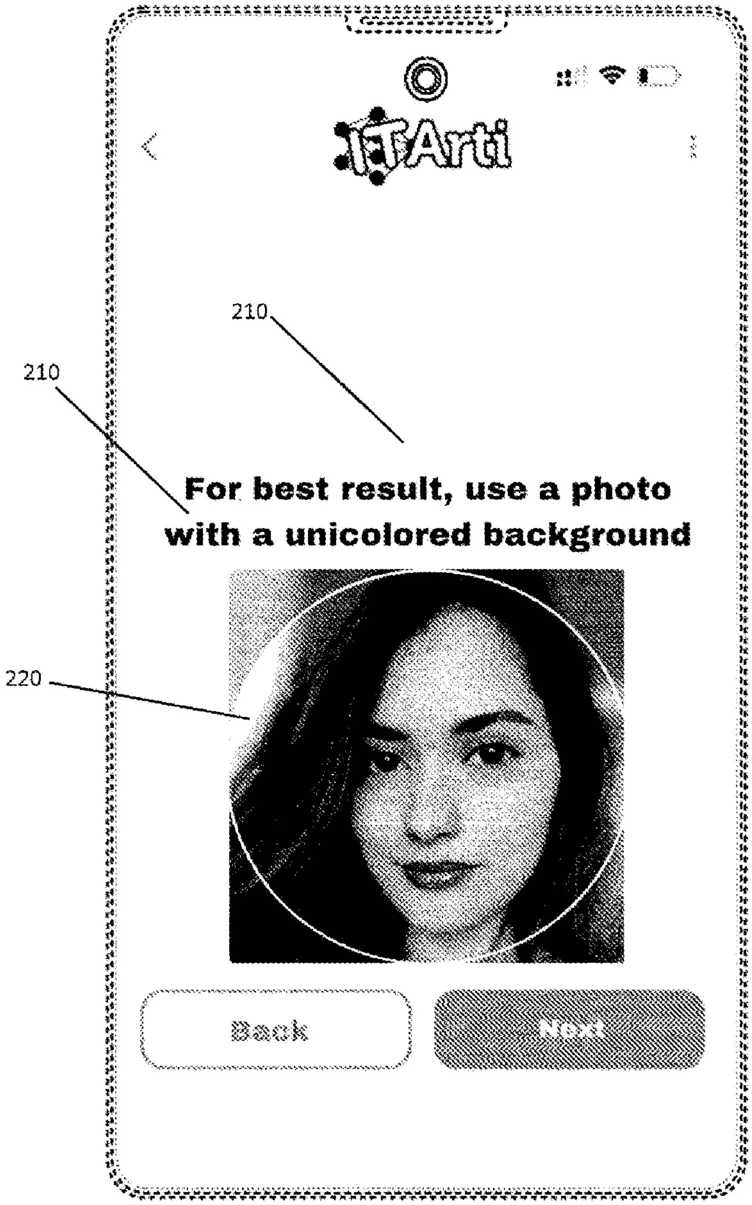
FIG. 2 depicts a screen view of an application of the present invention.

Referring to FIGS. 1 and 2, the string kit also includes an application 210 in communication with a personal electronic device 170. The application 210 converts an image 220 into a series of directions 180 for placing the thread 160 around the nails 140, thereby creating a string art replica of the image over the first surface 125 of the canvas 120.

The image 220 may be a photograph or other image provided by a user, for example, a person creating the string art.

In an embodiment of the invention, the string kit may include a removable layer 190 over the first surface 125 of the canvas 120.

Figure 3:
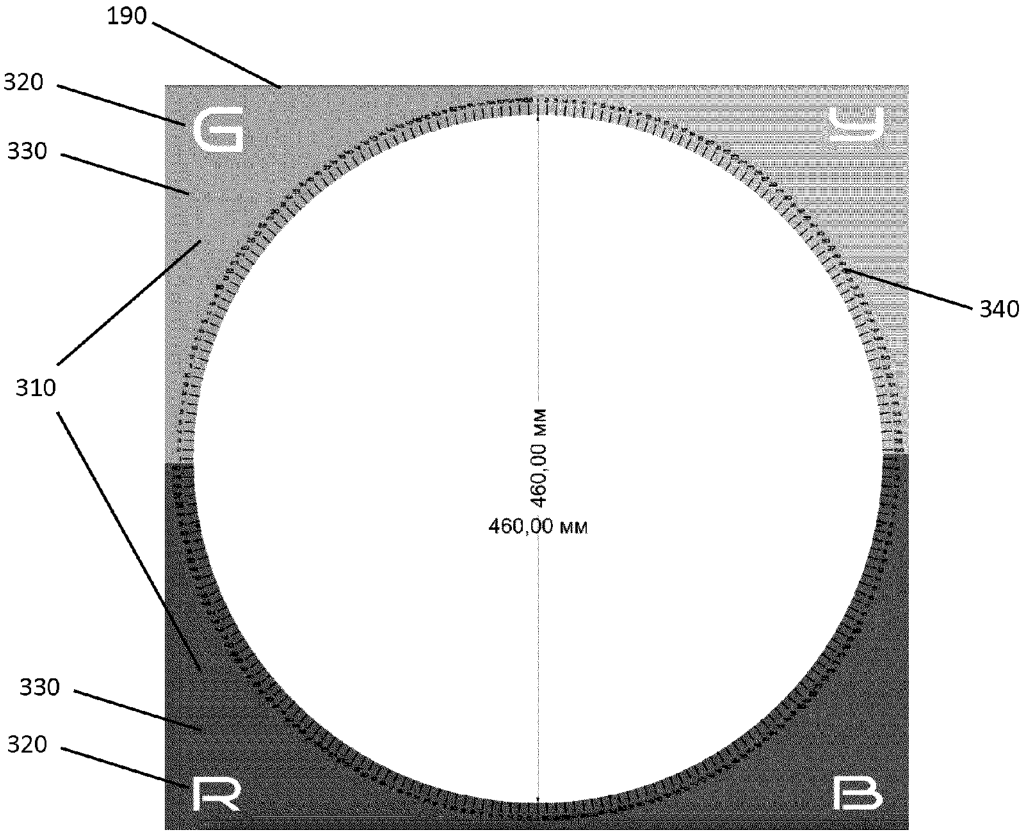
FIG. 3 depicts a frontal view of a removable layer of the embodiment of the string kit illustrated in FIG. 1.

As further illustrated in FIG. 3, the removable layer 190 may be divided into sectors 310, each sector marked with a letter 320 corresponding to a color 330. The removable layer 190 may also include digital numbers 340, each number corresponding to one of the nails 140 traversing the canvas 120.

Figure 4:
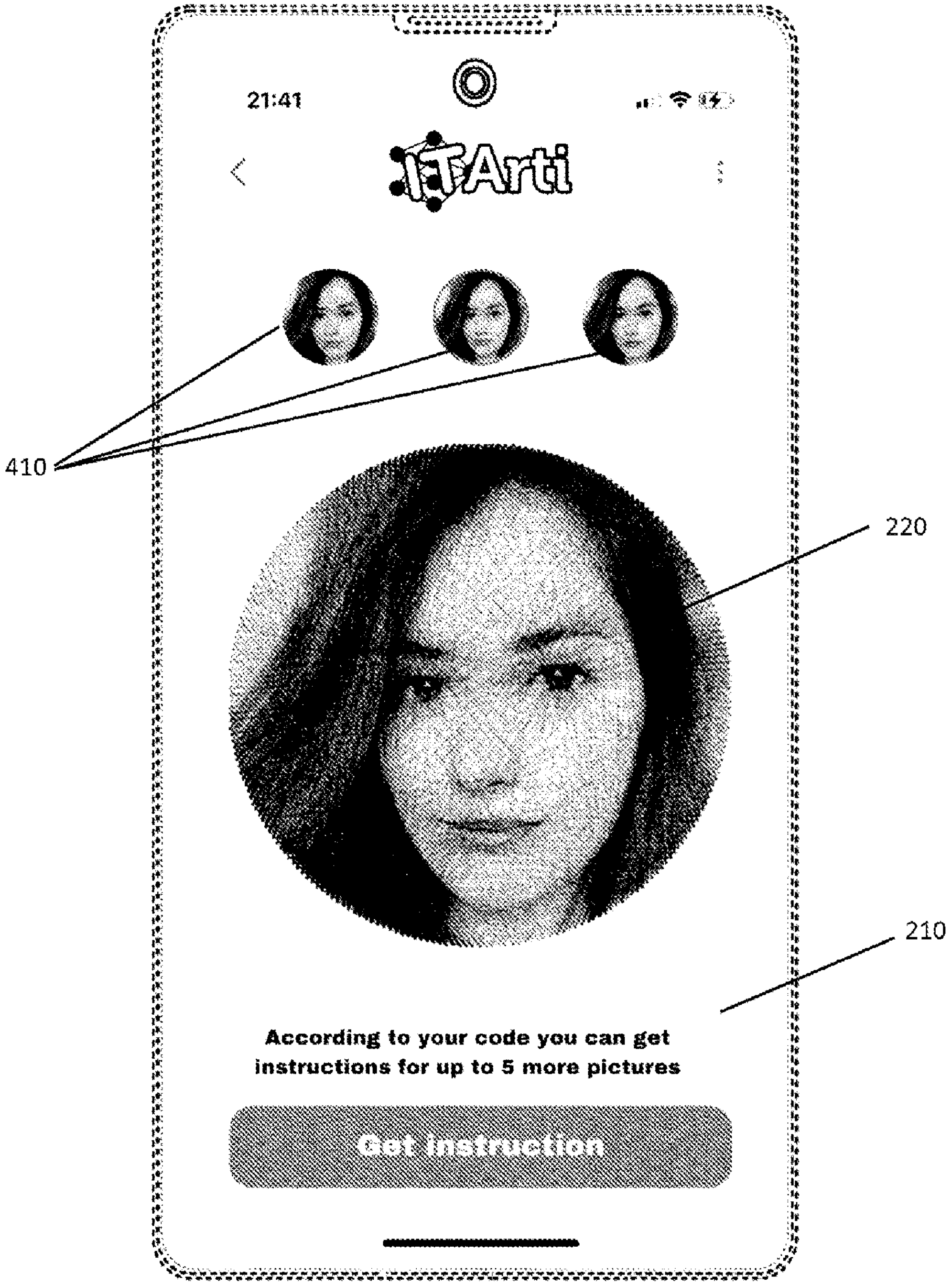
FIG. 4 depicts a further screen view of the application illustrated in FIG. 2.

Referring to FIG. 4, the directions 180 provided by the application may include more than one set of directions, with each set of directions corresponding to a color depth 410.

Figure 5:
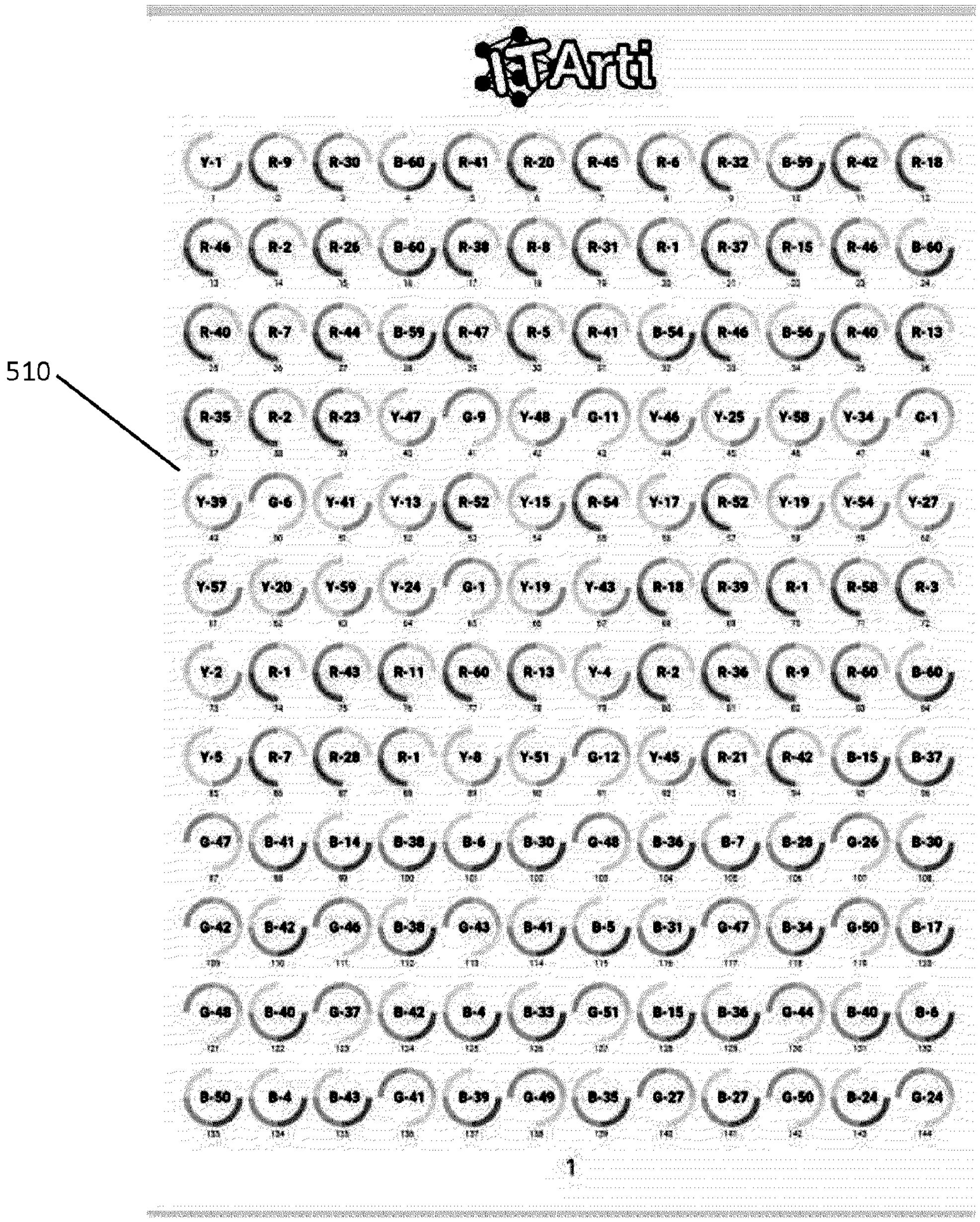
FIG. 5 depicts a further screen view of the application illustrated in FIG. 2.
Figure 6:
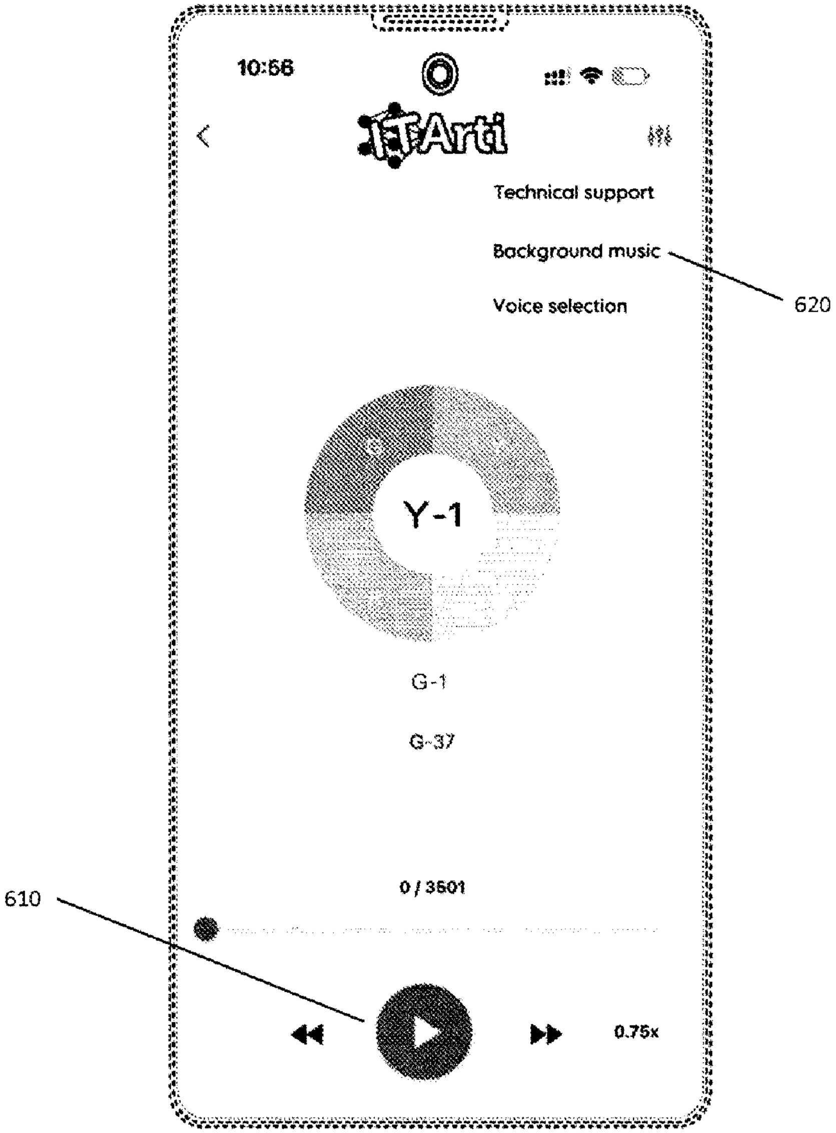
FIG. 6 depicts a further screen view of the application illustrated in FIG. 2.

Referring to FIGS. 5 and 6, the series of directions may be a text instructions 510 or the series of directions may be an audio instruction 610. The audio instruction may also include music 620.

The string kit may also include a device holder 195 for holding the personal electronic device 170.

Figure 7:
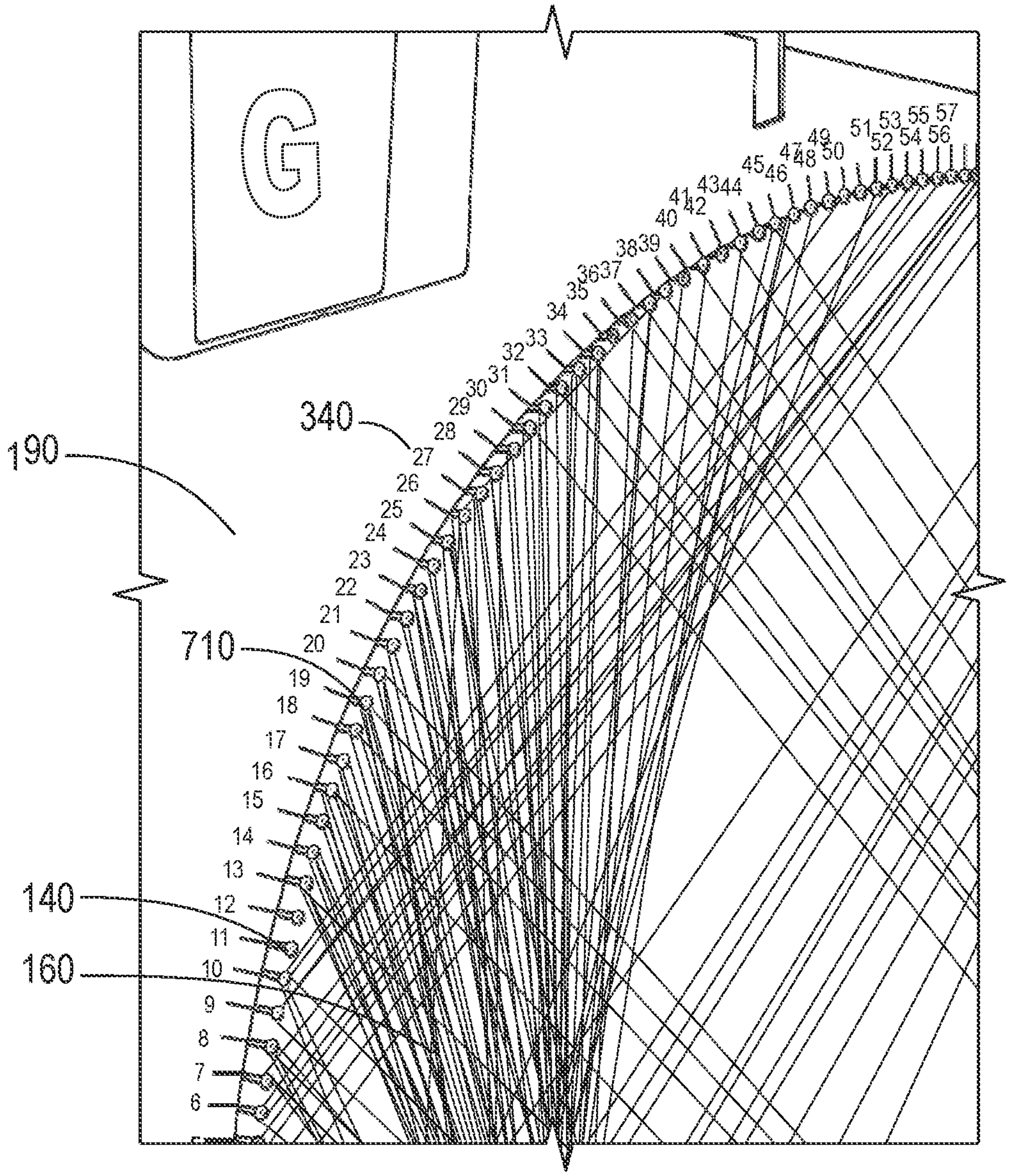
FIG. 7 depicts a close-up perspective view of the embodiment of the string kit illustrated in FIG. 1.
Figure 8:
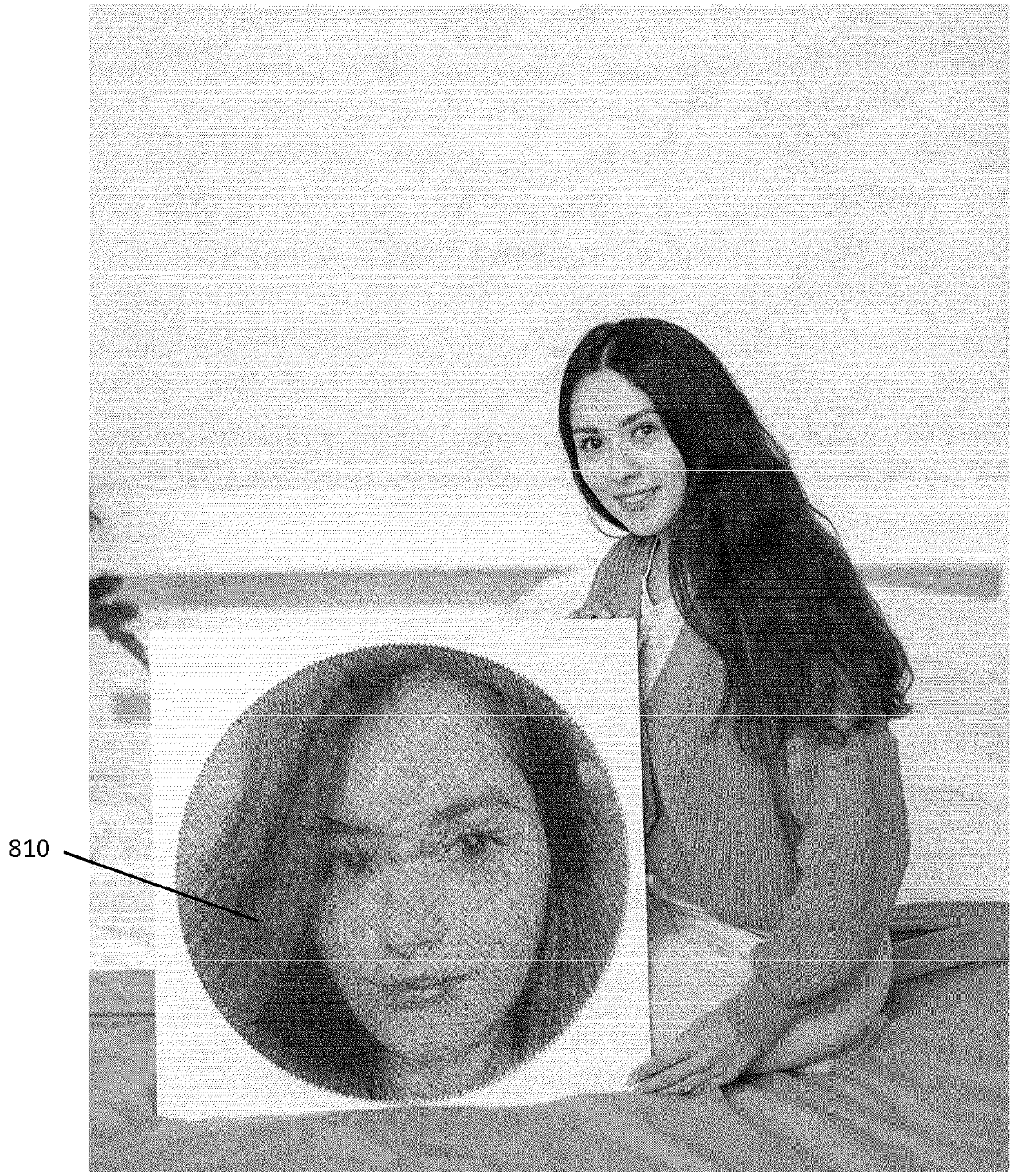
FIG. 8 depicts a perspective view of a string art held by a string kit user.

Referring to FIGS. 7 and 8, in an embodiment of the invention, the string kit may include a server in communication with the string art application. The server receives the image from the string art application. The image comprises a plurality of pixels, each pixel having a brightness value. The server aligns the image with the plurality of nails, selects an initial nail from the plurality of nails, provides a line extending from the initial nail to a second nail for each of the plurality of nails, calculates an average brightness value of the pixels in the line, records a darkest line with a lowest average brightness value, removes the darkest line from the image by adding an opacity value to the pixels of the darkest line and then designates the second nail as the initial nail. By iteratively recording the darkest line, the series of directions for placing 710 the thread 160 on the nails 140 is provided. The combination of straight lines of thread provides the string art replica 810 of the image 220.

A method for producing string art is also provided. A string kit container 105 is folded into a string kit stand 110. The string kit stand 110 includes a rigid backing 115 and a canvas 120 detachably mounted on the backing, the canvas having a first surface 125 and an opposing second surface (not shown). The string kit stand 110 also includes canvas holders 130 positioned on the backing 115 for holding the canvas 120 against the backing 115, nails 140 transversing the canvas 120, and a thread holder 150 mounted on the backing 115 for holding a skein of a thread 160. An image 220 is converted into a series of directions 510, 610 for placing the thread 160 around the nails 140 using a string art application 210 in communication with a personal electronic device 170. A string art replica of the image 220 is then created over the canvas first surface 125 by placing the thread 160 around the nails 140 according to the series of directions 510, 610.

The image 220 that is converted to a series of directions 510, 610 may be a photograph provided by a user to the string art application 210.

In a further embodiment of the method, folding the string kit container 105 into an art stand 110 may include mounting a removable layer 190 over the canvas first surface 125. In this embodiment, the thread 160 may be placed around a nail 140 within a sector 310 of the removable layer 190 marked with a letter 320 corresponding to a color 330, and/or the thread 160 may be placed around a nail 140 marked by a corresponding digital number 340 marked on the removable layer 190.

The image 220 may be converted into more than one set of series of directions, each set corresponding to a color depth 410.

The method may include converting the image 220 into a series of text instructions 510 and/or converting the image 220 into an audio instruction 610. The audio instruction may also include music 620.

The method may also include placing the personal electronic device 170 in a device holder 195 of the string kit stand 110.

Referring to FIGS. 7 and 8, in an embodiment of the invention, the method for producing string art may include a server in communication with the string art application. The server receives the image 220 from the string art application 210. The image 220 comprises a plurality of pixels, each pixel having a brightness value. The server aligns the image 220 with the plurality of nails 140, selects an initial nail from the plurality of nails, provides a line extending from the initial nail to a second nail for each of the plurality of nails, calculates an average brightness value of the pixels in the line, records a darkest line with a lowest average brightness value, removes the darkest line from the image by adding an opacity value to the pixels of the darkest line and then designates the second nail as the initial nail. By iteratively recording the darkest line, the series of directions for placing 710 the thread 160 on the nails 140 is provided. The combination of straight lines of thread provides the string art replica 810 of the image 220.

The string kit includes high-quality string, a canvas, and all the tools needed to create an artwork. The string kit includes instructions for creating the string art, and in one embodiment, includes voice instruction and music that accompany the assembly process, which turns the activity of creating the string art into a form of meditation.

The string kit provides numerous benefits, especially for people who are looking for ways to reduce stress and enjoy a creative activity. The step-by-step voice instruction guides users through the assembly process, eliminating the possibility of getting lost or feeling overwhelmed.

The string kit is suitable for all skill levels, from beginner to expert. It is a unique way to express creativity and create artwork that can be proudly displayed in any home. The string kit makes it easy and enjoyable to create a personal string art painting.

While some of the figures depict a person or a face of a person, the invention does not incorporate a human being, but rather the figures include a person for context and to provide exemplary output of one embodiment. The person is not part of the technical description, but rather an illustration of the context in which the system is intended to be used. Some of the drawings may include a person to provide scale to the string art object being generated and to demonstrate the quality of the artwork being generated. The human being is not part of the technical figures but serves as a visual reference for the scale of the size of output in one embodiment.

What is claimed is:

1. A string kit comprising:

a container for storing the string kit, the container being foldable into a stand for the string kit, wherein the stand includes:

a rigid backing;

a canvas mounted detachably on the backing and having a first surface and an opposing second surface;

a plurality of canvas holders positioned on the backing for holding the canvas against the backing;

a plurality of nails transversing the canvas; and a thread holder mounted on the backing for holding a skein of a thread; and a string art application in communication with a personal electronic device, wherein the application converts an image into a series of directions for placing the thread around the nails, thereby creating a string art replica of the image over the first surface of the canvas.

2. The string kit of claim 1, wherein the image is a photograph provided by a user.

3. The string kit of claim 1, wherein the stand further includes a removable layer over the first surface of the canvas.

4. The string kit of claim 3, wherein the removable layer comprises a plurality of sectors, each sector marked with a letter corresponding to a color.

5. The string kit of claim 3, wherein the removable layer comprises a plurality of printed numerical identifiers, each numerical identifier corresponding to one of the plurality of nails.

6. The string kit of claim 1, wherein the series of directions comprises at least two sets, each set corresponding to a color depth.

7. The string kit of claim 1, wherein the series of directions comprises at least one of a text instruction and an audio instruction.

8. The string kit of claim 7, wherein the audio instruction comprises music.

9. The string kit of claim 1, wherein the stand further includes a device holder for holding the personal electronic device.

10. The string kit of claim 1, further comprising a server in communication with the string art application, wherein the server:

receives the image comprising a plurality of pixels from the string art application, each pixel having a brightness value;

aligns the image with a digital representation of the plurality of nails corresponding to positions of the nails on the canvas;

selects an initial nail from the digital representation of the plurality of nails;

provides a line extending from the initial nail to a second nail for each of the digital representation of the plurality of nails;

calculates an average brightness value of the pixels in the line;

records a darkest line with a lowest average brightness value;

removes the darkest line from the image by adding an opacity value to the pixels of the darkest line; and designates the second nail as the initial nail.

11. A method for making a string art comprising:

folding a string kit container into a string kit stand, the string kit stand including:

a rigid backing;

a canvas mounted detachably on the backing and having a first surface and an opposing second surface;

a plurality of canvas holders positioned on the backing for holding the canvas against the backing;

a plurality of nails transversing the canvas; and a thread holder mounted on the backing for holding a skein of a thread; and converting an image into a series of directions for placing the thread around the nails using a string art application in communication with a personal electronic device; and creating a string art replica of the image over the first surface of the canvas by placing the thread around the nails according to the series of directions.

12. The method of claim 11, wherein converting an image comprises a user providing a photograph to the string art application.

13. The method of claim 11, wherein folding a string kit container into a string kit stand further includes mounting a removable layer over the first surface of the canvas.

14. The method of claim 11, wherein placing the thread around the nails according to the series of directions comprises placing the thread around a nail within a sector of a removable layer marked with a letter corresponding to a color.

15. The method of claim 11, wherein placing the thread around the nails according to the series of directions comprises placing the thread around a nail marked by a corresponding printed numerical identifier on a removable layer.

16. The method of claim 11, wherein converting an image into a series of directions comprises converting an image into at least two sets of a series of directions, each set corresponding to a color depth.

17. The method of claim 11, wherein converting an image into a series of directions comprises converting an image into at least one of a text instruction and an audio instruction.

18. The method of claim 17, wherein the audio instruction comprises music.

19. The method of claim 11, further comprising placing the personal electronic device in a device holder of the string kit stand.

20. The method of claim 11, wherein converting an image into a series of directions further comprises providing a server in communication with the string art application, wherein the server:

receives the image comprising a plurality of pixels from the string art application, each pixel having a brightness value;

aligns the image with a digital representation of a plurality of nails;

selects an initial nail from the digital representation of plurality of nails;

provides a line extending from the initial nail to a second nail for each of the digital representation of plurality of nails;

calculates an average brightness value of the pixels in the line;

records a darkest line with a lowest average brightness value;

removes the darkest line from the image by adding an opacity value to the pixels of the darkest line; and designates the second nail as the initial nail.

* * * * *